Mar. 20, 1923.

M. L. DODGE 1,448,917

HORN SUPPORT FOR CAN BODY SOLDERING MACHINES

Filed Jan. 15, 1921

INVENTOR
MERTON L. DODGE
BY
Richard J. Cook
ATTORNEY

Mar. 20, 1923. 1,448,917
M. L. DODGE
HORN SUPPORT FOR CAN BODY SOLDERING MACHINES
Filed Jan. 15, 1921 2 sheets-sheet 2
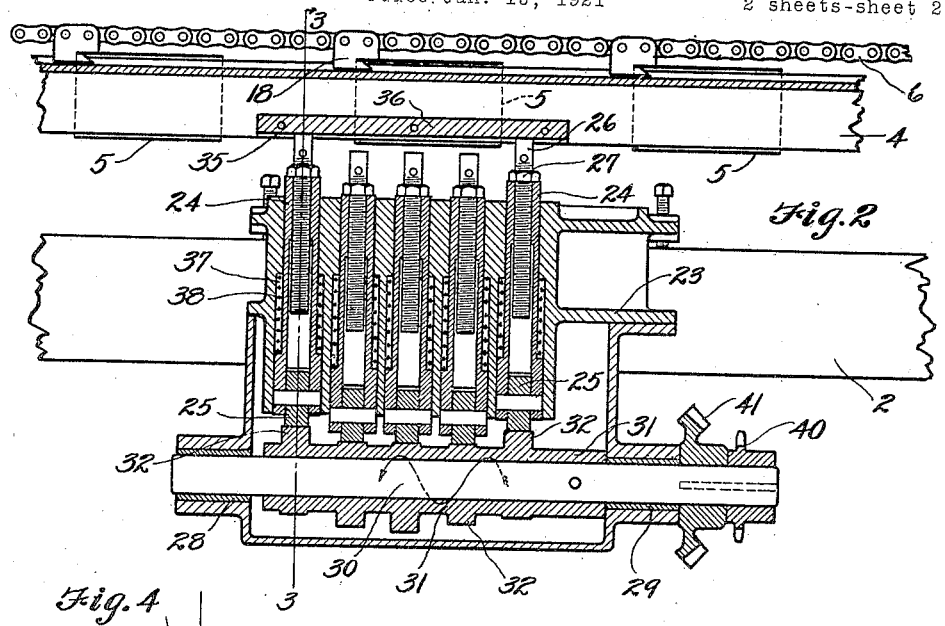
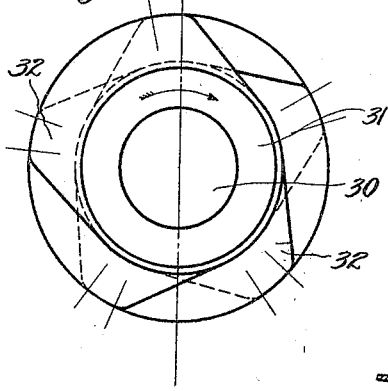
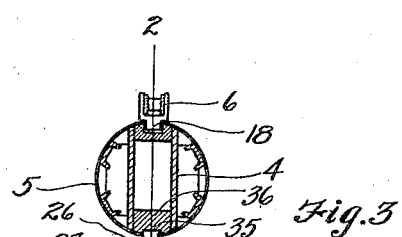
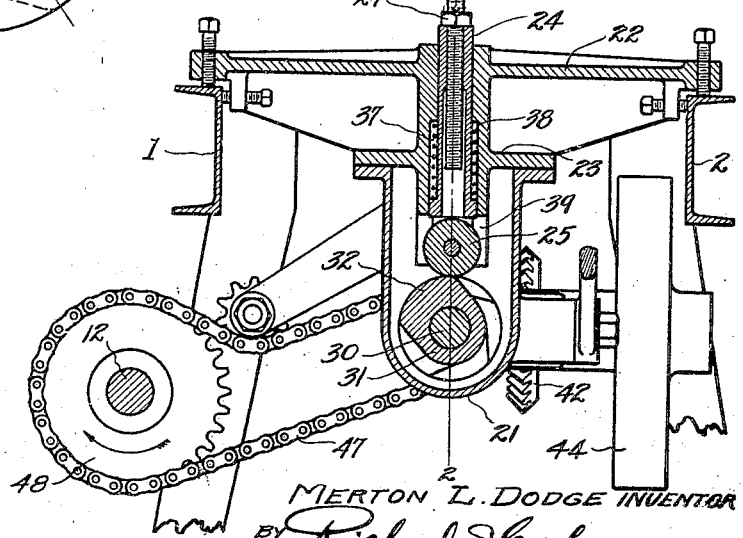
Merton L. Dodge, Inventor
by Richard J. Cook, Attorney Patented Mar. 20, 1923.

1,448,917

UNITED STATES PATENT OFFICE.

MERTON L. DODGE, OF SEATTLE, WASHINGTON, ASSIGNOR TO SEATTLE ASTORIA IRON WORKS.

HORN SUPPORT FOR CAN-BODY-SOLDERING MACHINES.

Application filed January 15, 1921. Serial No. 437,440.

*To all whom it may concern:*

Be it known that I, MERTON L. DODGE, a citizen of the United States, and a resident of the city of Seattle, county of King, State of Washington, have invented certain new and useful Improvements in Horn Supports for Can-Body-Soldering Machines, of which the following is a specification.

My invention relates to improvements in can body soldering machines; more particularly, it relates to a supporting means for the free end of what, in machines of the above character, is known as the horn; this being the member along which the can bodies are advanced after forming and for the application of solder to the longitudinal seam therein.

In can forming machines with which the present support is used, the horn is mounted to extend horizontally over a soldering roller; a conveyer mechanism operates along this horn to advance the can bodies successively to the soldering roller, which applies solder to the seam of the body, and then forwards them along the bar into a receiver from which they are taken up and passed on to machines for further work.

The type of horn used necessarily is of considerable length, in order that the can seams, after having the solder applied, will have sufficient time to set before the body is discharged, and, on account of its length, it is of such weight that it requires supports at its opposite ends. The receiving end of the horn may, and, in this case, has a permanent supporting member; this being possible, due to the fact that the pieces of tin or material wherefrom the can bodies are formed, when delivered onto the bar, are not closed but are sufficiently open at the seam that they may pass the supporting means. The delivery end of the bar, however, can not have a support fixed permanently thereto because such a support would prevent the forwarding of the can bodies, which, by the time they reach this point, have been closed about the horn and the longitudinal seam soldered.

Heretofore, it has been common practice to support the free end of the horn upon a pair of spaced, inwardly beveled rollers, which will permit the can bodies to be passed along the rod. This method has not proven entirely satisfactory, however, because such rollers cause pressure to be applied against the can walls which often disturbs the soldered seam before it has sufficiently set and also leaves undesirable creases in the body.

It is, therefore, the object of the present invention to provide a horn support for use in can body soldering machines, whereby the disadvantages of previously used means is eliminated and which operates in such manner that there will be a continuous support for the horn, while, at the same time, can bodies which are advanced continuously along the horn will not be permitted to engage the supporting means and the soldered seams remain undisturbed throughout the travel of the cans along the horn.

More specifically stated, it is the object of the present invention to provide a horn support comprising a plurality of supporting posts disposed at spaced intervals longitudinally of the horn together with cam mechanism operable to move the posts successively from and into supporting engagement with the horn; the action being such that as a can body is advanced along the rod the supporting posts are moved successively out of the way to avoid interference with its movement but are returned to supporting position as soon as the can has passed.

The general objects and purposes of the supporting means above stated and other objects and purposes hereinafter described are attained with improvements in mechanism, the preferred forms of which are illustrated in the accompanying drawings, wherein—

Figure 2 is an enlarged, longitudinal section through the horn support, showing the cam actuated posts and a portion of the horn which they support and along which the can bodies are forwarded; this section being taken on the line 2—2 in Figure 3.

Figure 3 is a transverse section taken on the line 3—3 in Figure 2.

Figure 4 is an enlarged end view of the cam shaft and cams, illustrating the relative positions of the latter.

Referring more in detail to the several views of the drawings wherein like reference numerals designate the same or like parts—

Figure 1:
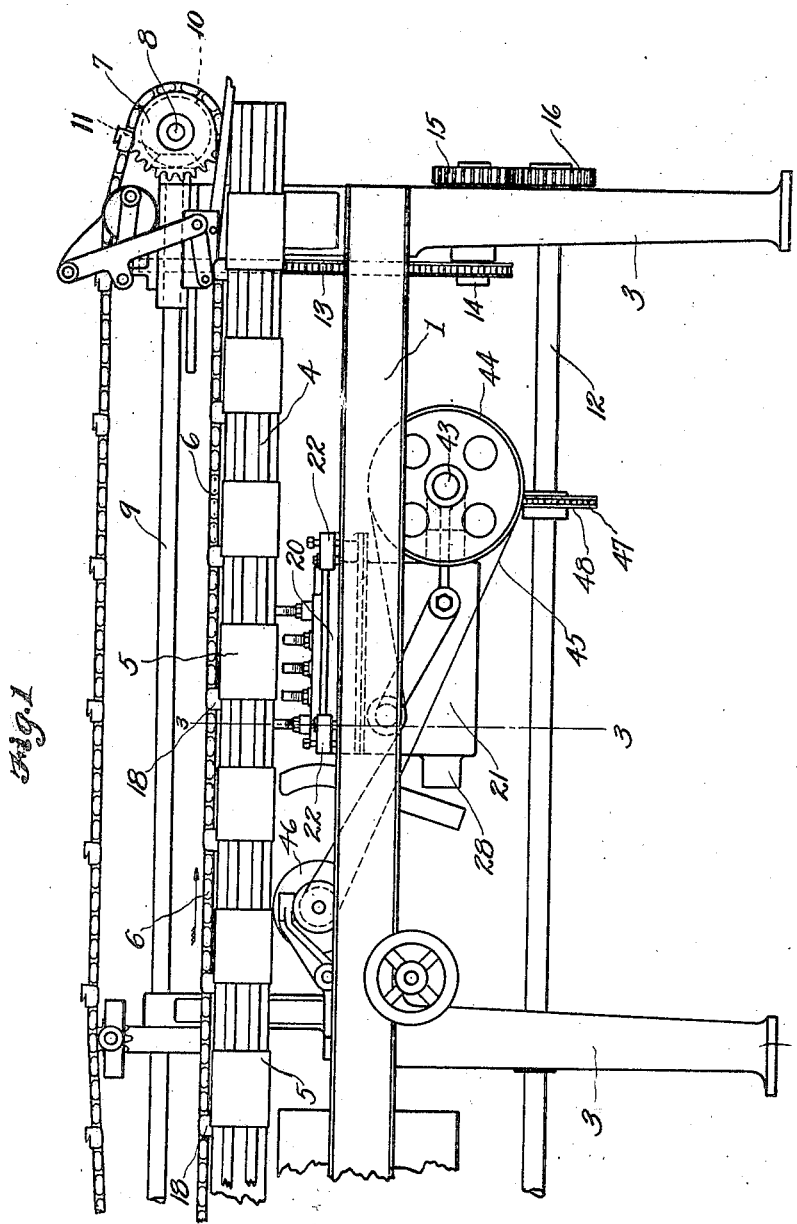
Figure 1 is a partial side view of a can body soldering machine of the type wherein a horn supporting mechanism embodied by the present invention is employed.

1 and 2 designate parallel, spaced apart, channel beams comprising a part of the frame structure of a can body soldering machine of the type wherein a horn support embodied by the present invention is used; these beams, and other parts of the machine, being supported by means of legs 3 fixed thereto at spaced intervals, as shown in Figure 1.

Extending centrally above and longitudinally of the frame of the machine is, what in such machines is termed the horn. This consists of an elongated bar, as illustrated at 4, which is of such construction that cylindrical can bodies, as indicated at 5, may, after being formed, be advanced along the horn to its discharge end. The receiving end of the horn is not shown in the drawings, but this is supported by a member fixed thereto while the delivery end, shown in Figure 1, is supported by members, presently described, which may be disengaged therefrom as is required to permit the can bodies to be advanced.

Mounted to operate along the upper side of the horn 4 is a conveyor chain 6. This, at opposite ends of the horn, extends over sprocket wheels of the character shown at 7 in Figure 1. The sprocket wheel 7 shown is fixed on a shaft 8 that is driven through connection with a shaft 9 extending longitudinally of the frame; the driving connection consisting of intermeshing bevel gears 10 and 11, Figure 1, that are fixed respectively on the shafts. The shaft 9 in turn is driven from a main drive shaft 12 mounted along the lower part of the frame, through connection provided by means of a chain belt 13 which operates over sprocket wheels respectively on the shaft 9 and on a short shaft 14 and intermeshing gears 15 and 16 fixed respectively on the short shaft 14 and end of shaft 12.

Fixed on the conveyor chain at equally spaced intervals are hooks 18 which are adapted, as the chain moves along, to engage the can bodies 5 formed about the horn and to advance them at equally spaced intervals to its discharge end.

The horn support embodied by the invention is indicated as a whole at 20 in Figure 1. This comprises a housing 21 which is rigidly suspended between the beams 1 and 2 directly below the horn by means of cross heads 22 at its opposite ends, which are formed as an integral part of the cover portion 23 of the housing.

Mounted slidably within vertical guide channels in the cover 23 to engage the horn at spaced intervals longitudinally thereof, is a plurality of horn supporting posts 24, each of which carries a cam roller 25 at its inner end and at its upper end has a bolt 26 threaded thereinto and which are locked at an adjustably extended position by means of lock nuts 27 threaded thereon and against the upper end of the posts. Mounted within bearings 28 and 29, at opposite ends of the housing, is a cam shaft 30 whereon is fixed a cam sleeve 31 equipped with individual actuating cams 32 for each of the posts 24. The posts are actuated by their respective cams through the intermediacy of the rollers 25 and when the posts are moved upwardly to their limit by the cams the bolts therein supportingly engage the horn 4.

An important feature of the invention resides in the relation of successive cams. These are disposed in such advanced relation to each other that the posts 24 will be successively moved from supporting contact with the horn for the interval of time required for a can body to be forwarded past the same and will then be returned to supporting position. In the present construction where five posts are used, there is at all times at least one post supporting the horn.

To prevent lateral movement and to add to the rigidity of the support of the horn, I have provided that the upper ends of the bolts 26 when in supporting contact with the horn will fit within a longitudinal groove 35 formed within a hardened plate 36 that is inserted longitudinally within the under side of the horn, and against which the bolt ends engage.

The lower part of the post channels are somewhat larger than the posts and form intermediate channels 37 wherein springs 38 are mounted. These engage oppositely formed shoulders on the posts and in the channels to urge the posts downwardly to follow their respective cams. Rotation of the posts within their channels is prevented by mounting the rollers at their lower ends to move within transverse slots 39 in the lower ends of the channeled supports, as shown in Figure 3.

On the outer end of the cam shaft 30, Figure 2, is keyed a sprocket wheel 40 and a bevel gear 41; the latter operates in mesh with a gear wheel 42 fixed on one end of a shaft 43 carried by the housing and provided at its opposite end with a belt wheel 44 over which a belt 45 operates to drive a disk wiper 46. A driving chain belt 47 is extended over the sprocket 40 and another larger sprocket wheel 48 that is mounted on the driving shaft 12. The driving connections thus provided are synchronized so that there will be one revolution of the cam shaft with each forward movement of the conveyor chain through a distance equal to the spacing of the hooks 18; and the posts will disengage the horn as is required to permit the cans to pass and still retain it permanently supported.

Assuming that the parts are so constructed and assembled and operatively connected as described, in operation it is apparent that the horn will be continuously supported upon the ends of the bolts 26 in the posts 24 and that the latter will, due to the arrangement of the cams on the cam shaft, be moved successively from and into contact with the horn as is required to permit the can bodies to be advanced along the horn.

It will also be noted that the horn will be held against lateral displacement by the projection of the ends of the bolts 26 into the groove 35, and that if adjustment is required it can be made by resetting the bolts 26 or by shifting the housing laterally or vertically through its connections with the beams 1 and 2.

Having thus described my invention, what I claim as new therein and desire to secure by Letters Patent, is:

1. In a machine of the character described, the combination with a frame structure, a horn and a conveyer belt operating along the horn for advancing can bodies continuously along the horn at regularly spaced intervals, of a horn support comprising a housing mounted on said frame, a plurality of posts mounted vertically within said housing to be moved upwardly into supporting contact with said horn at closely spaced intervals longitudinally thereof, means engaging the posts to yieldingly resist upward movement thereof, a cam shaft mounted within the housing, and driven in synchronism with the conveyer belt, and cams arranged on said shaft for actuating the said posts successively from and against the horn in the manner and for the purpose set forth.

2. In a machine of the class described, the combination with a frame structure, a horn and a conveyer belt operating along the horn for the advancement of can bodies along the same at regularly spaced intervals, of a horn support comprising a housing supported within the frame, a plurality of posts slidably mounted within the housing, having bolts adjustably extending from the upper ends thereof to be moved by the posts into and from supporting engagement with the horn at different points longitudinally thereof, cam rollers mounted on the lower ends of said posts, a cam shaft driven in synchronism with the conveyer mechanism, and cams fixed on said shaft for engaging said rollers to actuate the post bolts successively against the horn and yieldable means for retracting the posts from the horn during receding movement of the cams.

3. In a machine of the class described, the combination with a horn provided with a downwardly opening longitudinal groove, and a conveyer mechanism operable to advance can bodies along said horn, of a horn support comprising a plurality of vertically mounted posts provided with adjustable members at their upper ends which are movable by the posts into and from supporting relation with the horn within said longitudinal groove at different points and means operating in synchronism with the conveyer for actuating the posts in the manner as and for the purpose set forth.

4. In a machine of the class described, the combination with a horn and a conveyor mechanism operating to advance can bodies along the horn, of a horn support comprising a housing having guideways therein, a plurality of posts slidably mounted within the guideways, having adjustable members at their upper ends, and adapted for supporting engagement with the horn at different points longitudinally thereof, springs coiled about the posts within the guideways engageable at their opposite ends with the housing and with the posts to retain the latter normally disengaged from the horn, cam rollers mounted at the lower ends of the posts, a cam shaft driven in synchronism with the conveyor mechanism and a sleeve fixed on the shaft having cams formed thereon for engaging said rollers to actuate the posts successively against the horn for the purpose set forth.

Signed at Seattle, Washington, this 8th day of January, 1921.

MERTON L. DODGE.